United States Patent
Phillips

(10) Patent No.: US 7,285,594 B2
(45) Date of Patent: Oct. 23, 2007

(54) PROCESS FOR THE AQUEOUS PLASTICIZATION OF POLYVINYL ACETAL RESINS

(75) Inventor: Thomas R. Phillips, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/099,901

(22) Filed: Apr. 5, 2005

(65) Prior Publication Data

US 2006/0235148 A1 Oct. 19, 2006

(51) Int. Cl.
*B32B 17/10* (2006.01)
*B32B 27/00* (2006.01)
*C08C 19/04* (2006.01)
*C08F 3/06* (2006.01)
*C08F 8/08* (2006.01)
*C08K 5/52* (2006.01)
*C08L 29/04* (2006.01)

(52) U.S. Cl. .................. 525/61; 524/557; 524/145; 428/442; 428/426; 428/441; 428/500

(58) Field of Classification Search ............... 525/387, 525/61; 524/557, 145; 428/426, 441
See application file for complete search history.

(56) References Cited

U.S. PATENT DOCUMENTS

| 2,046,378 | A |   | 7/1936  | Haux |
| 2,453,569 | A |   | 11/1948 | Debacher |
| 2,829,399 | A | * | 4/1958  | Caracciolo et al. ......... 425/203 |
| 2,864,784 | A | * | 12/1958 | Marks ........................ 524/308 |
| 3,153,009 | A |   | 10/1964 | Rombach |
| 3,271,235 | A | * | 9/1966  | Mont et al. ................. 428/437 |
| 5,886,076 | A |   | 3/1999  | Keane et al. |
| 6,599,630 | B1 | * | 7/2003  | Fugiel et al. ............... 428/437 |
| 2004/0234778 | A1 | * | 11/2004 | Fukatani et al. ............ 428/426 |
| 2005/0256258 | A1 | * | 11/2005 | Keller ........................ 524/557 |

* cited by examiner

*Primary Examiner*—Duane Smith
*Assistant Examiner*—Ives Wu

(57) ABSTRACT

An improved aqueous slurry composition for the plasticizing of polyvinyl acetal resins whereby salts, acids and/or bases are used to enhance absorption rates of the plasticizer into the resin, and a process therewith for the production of plasticized polyvinyl acetal resins.

20 Claims, No Drawings

PROCESS FOR THE AQUEOUS PLASTICIZATION OF POLYVINYL ACETAL RESINS

BACKGROUND OF THE INVENTION

Laminated safety glass, such as used in vehicle windshields, is typically two mating sheets of glass bonded together with an interlayer of a thermoplastic material, such as polyvinyl butyral resin (PVB). When used as interlayer for safety glass, polyvinyl butyral resin is typically highly plasticized to make it soft and tacky. Laminated safety glass helps to protect from possible injury or other undesirable results of shattered glass resulting from forceful impacts. If safety glass is broken by impact, the interlayer remains substantially bonded to the broken glass, providing a form of protection from sharp and potentially dangerous shards. If in an accident an occupant is thrown into the windshield, the glass should yield somewhat to minimize impact injuries. Optimization between these two requirements requires careful control of the resin-to-glass adhesion. Adhesion that is too low may not provide an effective line of protections from shard. If adhesion is too high the unyielding windshield may worsen impact injuries. To achieve this control of adhesion, adhesion-limiting salts are typically added during the sheet forming extrusion step. Typical salts are alkali and alkaline earth salts, such as potassium or magnesium acetate, added in an amount sufficient to provide a cation concentration of about 100-500 mg/kg resin.

Plasticization of PVB is considered essential to its use in most types laminated safety glasses in which it is used. Plasticization of PVB can be accomplished by any number of known methods. For example, it is well known in the art to blend the plasticizer and the resin in a mixer, such as a Henschel or Banbury mixer, with subsequent extrusion compounding as described in U.S. Pat. No. 2,453,569. A solvent process, described by Haux in U.S. Pat. No. 2,046,378, used a $C_1$ to $C_3$ alcohol to introduce the plasticizer. Direct extrusion compounding is described in U.S. Pat. No. 5,886,075A. Another procedure is by absorption of the plasticizer into the resin from an aqueous slurry followed by a de-watering step and extrusion compounding.

In an aqueous slurry process, it has been found that different plasticizers are absorbed into the resin at different rates, thereby creating capacity and cost penalties. An aqueous slurry procedure has been described by Marks in U.S. Pat. No. 2,864,784, and describes the use of a stirred aqueous slurry of resin and an essentially water-insoluble plasticizer.

In the slurry process, the absorption rate of the plasticizer from the slurry into the resin is controlled by a number of parameters including ratio of solids (acetal resin and plasticizer) to water, plasticizing temperature, time, agitation speed and the like. The practical temperature range for aqueous plasticization as practiced in the prior art is from about 20° to 65° C. Due to the practical limitations of the conventional aqueous plasticization process, once a plasticizing system has been defined the only ways to increase capacity have been to add additional plasticizing vessels or increase agitation. Both of these options are costly and, in some instances, impractical due to structural limitations. The aqueous slurry process is also subject to significant variability in rate at which different plasticizers migrate into the resin.

After absorption of the plasticizer is complete, the plasticized resin is in the form of a plasticized slurry containing about 10% to about 25% solids (wet plasticized resin) and about 90% to about 75% of the aqueous phase. This slurry is first fed to a de-watering system that separates and removes 85-90% of the aqueous phase. The remaining aqueous phase, about 10% to about 15%, is entrained in the slurry solids that are forced into an extruder feed throat. This entrained water is removed by vacuum extraction in the extruder process. The extrudate is formed into sheeting by use of a slot sheeting die.

It is desirable to improve the process for the plasticization of polyvinyl butyral resins and to introduce adhesion-limiting salts in the process, thereby eliminating the subsequent separate step in which the adhesion-limiting salts must be added and thoroughly mixed. The present invention provides such a process.

SUMMARY OF THE INVENTION

A slurry composition comprising a polyvinyl acetal, a water-insoluble or sparingly soluble plasticizer, water, and an ionizable additive, which ionizable additive provides a means to accelerate absorption of the plasticizer into the polyvinyl acetal.

A process for the production of plasticized polyvinyl butyral resin comprising the step of producing a slurry comprising a polyvinyl acetal, a water-insoluble or sparingly soluble plasticizer, water, and an ionizable additive.

DETAILED DESCRIPTION OF THE INVENTION

Trademarks herein are shown in upper case.

The present invention is a composition for the plasticization of a polyvinyl acetal resin comprising at least one ionizable additive, at least one plasticizer, water, and resin. The ionizable additive(s), plasticizer(s), and water are contacted with the polyvinyl acetal resin to effect plasticization of the resin. In a second embodiment, the invention provides an improved process for the plasticization of polyvinyl acetal resins comprising mixing the above composition and isolating the plasticized polyvinyl acetal in a solid form.

The resin can be any polyvinyl acetal, and is most commonly polyvinyl butyral, (e.g., BUTACITE®, available from E. I. du Pont de Nemours and Company, Wilmington Del.).

The ionizable additive useful in the practice of the present invention comprises at least one of a water-soluble ionizable acid, salt, base, or buffer system. Examples of ionizable additives are organic acids and inorganic and organic salts and bases, including, but not limited to, alkali and alkali earth metal acetates and citrates, and buffer systems containing sodium acetate and acetic acid, sodium hydrogen carbonate and sodium hydroxide, or citric acid and sodium hydroxide. Examples of organic salts are the quaternary salt of N,N-diethyl-cyclohexylamine with acetic acid and sulfuric acid. Examples of organic buffer systems include citric acid with sodium hydroxide and arginine with 2-[(N-cyclohexylamine)ethane]-sulfonic acid (CHES). An example of an organic acid is acetic acid.

A preferred ionizable additive is acetic acid.

Other preferred ionizable additives are adhesion limiting salts such as potassium and magnesium acetates, the importance of which was discussed above. By controlling the amount of the ionizable additive left in the wet cake as fed to the extruder, the necessary concentration of potassium or magnesium acetate required to control the resin-to-glass adhesion can be obtained in the extruded resin. The concentration of ionizable additive in the form of adhesion-limiting salt used in the slurry is an amount sufficient to provide the desired cation concentration in the range 30-500 mg/kg in the extruded resin. This concentration can be estimated based on the amount of the aqueous phase loaded to the extruder after de-watering. In the practice of the present invention, the de-watering and extrusion techniques are conventional and were described above (see Background Section). In the extrusion process, residual salts retained in the resin phase are those that have partitioned to the plasticized resin phase and residual salts in the portion of the aqueous phase introduced into the extruder. Salts from both sources become fully compounded in the resin phase during extrusion since loss of water during extrusion is by evaporation. The bulk of the salts are separated from the plasticized resin in the de-watering process, when 85% to 90% of the aqueous phase is removed prior to extrusion. The concentration of ionizable additives in the form of adhesion limiting salts is proportionately adjusted for a set of process conditions to provide the desired concentration of adhesion limiting salt in the extruded and plasticized resin. Incorporating the adhesion-limiting salts as part of the plasticization step eliminates the need to add them at the extrusion step.

The concentration of the ionizable additive or additives based on the total weight of the aqueous phase is from about 0.001% to about 7.0% and preferably from about 0.02% to about 1.0%. The weight ratio of resin phase to aqueous phase is from about 10:90 to about 25:75, and preferably from about 15:85 to about 20:80.

Preferably, the ionizable additives useful in the practice of the present invention are compounds that are not also strong oxidizing agents for, or that otherwise react with, the resin, particularly at the elevated temperatures encountered during extrusion. Examples of ionizable additives that can be undesirable due to their oxidizing properties are nitrates. Other unsuitable acids, salts, and bases include chemicals that have the potential to corrode equipment (for example, hydrochloric acid and chlorides) or adversely alter the optical properties of the extruded film (for example, sodium formate).

In some embodiments of the present invention, ionizable additives can form particulates in the extruded film and can create haze. For practical purposes unrelated to the present invention it is desirable that haze in the extruded film, measured as diffuse transmittance divided by total transmittance and reported as a percent, be kept to 1% or less. For this reason it can be desirable that the particle size of salt in the extruded film is smaller than that required to scatter visible light, e.g., less about 300 nm.

Heat results from both the frictional forces acting on the extrudate during extrusion as well as the extruder heating elements. Maximum temperatures in the extruder are dependent on the extrudate composition, particularly on the plasticizer and residual water contents, and are typically in the range 160-220° C. Polyvinyl acetals are stable over a wide pH range, e.g., between pH 1.5-10.

Other conventional additives may be added at the plasticization step or subsequently. Examples of conventional additives are colorants and thermal and ultraviolet stabilizers.

Coatings, such as coatings to block infrared and ultraviolet radiation, may be coated on a glass surface that contacts the resin layer. Colorants may be added to the resin to affect visible light transmission. Except for ionizable additives that provide adhesion control, the minimum amount of the ionizable additive that is effective is preferred. Larger amounts of ionizable additives are potential sources of haze formation due to their insolubility in the extruded and dried resin, or by reaction with residual processing aids from the polyvinyl acetal production. When acetic acid is used as the ionizable additive, at lower concentrations much of the acid is lost from the polymer by evaporation during extrusion. At higher acetic acid levels, residual acetic acid in the processed resin increases and can adversely affect such coatings and colorants.

Plasticizers useful in the practice of the present invention are conventional plasticizers for polyvinyl acetals well known to those skilled in the art. Examples include, but are not limited to, dibutyl sebacate (sometimes described as "DBS"), di-(beta-hydroxyethyl)adipate, dihexyl adipate (sometimes described as "DHA"), triethyleneglycol di-2-ethylbutyrate (sometimes described as "3GH"), tetraethylene glycol di-heptanoate (sometimes described as "4G7"), and triethylene glycol di-2-ethylhexanoate (sometimes described as "3GO").

Water used in the aqueous slurry is preferably deionized water.

In the process of the present invention, an ionizable additive is added to an aqueous slurry of polyvinyl acetal resin. A suitable plasticizer is then added and the mixture agitated. The particulate resin absorbs the organic plasticizer, which is insoluble or only partially soluble in the aqueous phase. It is also possible to add the slurry to the plasticizer in a plasticizing vessel and then add the salt, acid or base. The process is operated under controlled temperature and with agitation. This process provides fast absorption rates without adversely affecting product properties. By adding the ionizable additive, which dissociates in the aqueous slurry, plasticizer absorption rates can be greatly increased at low temperatures thereby achieving the desired plasticization without lengthy absorption times or particle agglomeration. This process can reduce capital requirements.

In a more specific description of the process of the present invention, resin, ionizable additive, plasticizer, and water are slurried at a temperature of 20°-65° C. and preferably 35°-45° C. Based on 100 parts by weight of dry resin, the amount of plasticizer is from about 20 to about 50 parts by weight and preferably from about 30 to about 40 parts by weight. The amount of water is from about 400 to about 1900 parts by weight and preferably from about 550 to about 900 parts by weight. The amount of water includes water introduced in the form of the wet unplasticized resin. Based on 100 parts by weight of water, the amount of the ionizable additive is from about 0.0001 to about 0.05 parts by weight and preferably from about 0.0002 to about 0.002 parts by weight. When the ionizable additive is also incorporated as an adhesion limiting salt, higher concentrations are used to provide the desired residual cation concentrations described above.

For each ionizable additive system, a lower limit exists where the acceleration in plasticization rate becomes negligible. For some ionizable additives at concentrations in the aqueous phase of about 0.02%, enhancement of the plasticizing rate becomes negligible. In a preferred embodiment, however, acetic acid remains effective at these low concentrations (as is shown in Example 12).

In a preferred embodiment of this invention, a slurry of between 10 and 15 percent solids, calculated as the dry weight basis of resin in water, is added to a reactor vessel and heated to a temperature that is low enough that the resin particles will not agglomerate when fully plasticized, preferably 35° to 45° C. The mixture is agitated by conventional means and between 0.01 percent and 5 percent, based on the total weight of the water, of an ionizable additive is added. The plasticizer, from about 20 to about 50 parts per 100 parts resin on a dry weight basis and preferably from about 30 to about 40 parts is then added to the above slurry. However, the order of addition can be changed depending on the process.

In another preferred embodiment of this invention, an ionizable additive system that can also be an adhesion control additive system is used. Potassium and magnesium are well known in the literature to be adhesion control additives in PVB resin systems for laminated safety glass applications. For example, plasticization can be carried out using potassium ion (as potassium acetate) and magnesium ion (as magnesium acetate tetrahydrate).

The addition of the low level of ionizable additives causes the absorption rate of the plasticizer to be increased and the residual level of unabsorbed plasticizer to be correspondingly minimized, without any adverse effects on the plasticized resin and its subsequent uses. The accelerated rate minimizes the need for additional process equipment. Typically, absorption of the plasticizer causes an exponential decrease in unabsorbed plasticizer, which never decreases to zero. Processes operate so as to either minimize the amount of residual plasticizer or for some period that optimizes between low residual plasticizer and process output. With the accelerated absorption of plasticizer in the process of the present invention, processes can more readily be operated to minimize residual plasticizer. In the aqueous waste, lower residual plasticizer concentration means less raw material losses. Since the aqueous phase becomes a waste steam at the extrusion step of the process and must be disposed of in according to environmental regulations, the lower the residual plasticizer, the lower the cost of environmental control. The wastewater can be used in other areas of the process as deemed appropriate, such as, in cooling, rinsing, and the like.

The effectiveness of the ionizable additive systems of the present invention can be determined by the residual amount of plasticizer after a fixed period of absorption. For the purpose of the examples in the present invention, the period was 1.5 hours.

The absorption of the plasticizer into the resin particles can be determined by difference, by taking aliquots of the aqueous phase, extracting the residual plasticizer and measuring the residual amount left by an appropriate technique, such as gas chromatography or infrared spectroscopy.

In the following examples summarized in Table 1, residual plasticizer concentration after 1.5 hours is used to determine the effectiveness of the improved process. Polyvinyl acetal resins may vary from batch to batch and with other parameters. Consequently, the results are compared or normalized to the residual plasticizer left after 1.5 hours in controls slurried with the same resin and plasticizer, but without any ionizable additive. Thus a result of 1 would indicate the same performance as the control, and a result of greater than 1 indicates lower residual plasticizer and, therefore, a faster absorption rate than the control. The "normalized residual plasticizer" is given by:

$$C_0/C_n$$

where $C_0$ is the residual plasticizer concentration after 1.5 hours of a control example and $C_n$ is the residual plasticizer concentration of example n after 1.5 h, using the same resin batch and same plasticizer but with the ionizable additive.

The plasticizer content of the extruded resin may be determined by gravimetric or instrumental methods, such as FT-IR or NMR verses known standards. Such methods are well known to those skilled in the art.

It should be obvious to one skilled in the art that the composition and process of the present invention is not intended to be limited to the specific plasticizer used. Rather it is applicable to all vinyl acetal resins and plasticizers used to make plasticized polyvinyl acetal resins by aqueous plasticization processes.

MATERIALS AND TEST METHODS

Polyvinyl Butyral Resin.

Hydrated PVB resin prepared according to U.S. Pat. No. 3,153,009 (obtained from E.I. DuPont Co., Wilmington, Del.) was filtered to remove excess water. Hydrated water was determined by a Moisture Determination Balance (Ohaus, Model MB200, Florham Park, N.J.). The hydrated PVB was then re-slurried for the Examples.

Apparatus.

Reactor: A 2-L or 3-L water-jacketed resin kettle with internal baffles (LabGlass Corp., Buena N.J.).

Agitator: Constant speed agitator (Barnant Company, Mixer Controller, Model No. 750-4550, Barrington Ill. and Servodyne Mixer Head, Model No. 4550-10, Cole Parmer Company, Vernon Hills Ill.).

Impeller: 2000-mL reactor—two 3.5 inch. diameter 39° three blade low shear hydrofoils; 3000-mL reactor—three 3.5 inch. diameter 39° three blade low shear hydrofoils (Philadelphia Mixer Co., Philadelphia, Pa.).

Test Method 1. Quantitative Measurement of Plasticizer.

A 2.0 mL aliquot of the aqueous phase containing residual plasticizer is extracted with 1.0 mL of hexane. The residual plasticizer, measured as milligrams of plasticizer per milliliter of water, is determined by measuring the absorbance of the carbonyl peak on a Perkin-Elmer Spectrum® 1000 FT-IR spectrometer using a 0.1 mm pathlength polyethylene IR cell (Barnes Analytical, Stamford, Conn.). The sample result is determined against an internal calibration method using known amounts of plasticizer in hexane stored in the instrument computer software.

Test Method 2. Polymer Stability

An aliquot of plasticized polymer is taken from the plasticizing reactor, dried and pressed into a disk nominally 25 mm (1.0 inch) in diameter and 1.0 mm (0.04 inch) in thickness.

The disk in placed in a Teflon® cup and heated in a Paar Bomb Reactor at 212° C. in an air atmosphere for 2.5 hours.

The disk is cooled and the Yellowness Index (YI) measure on a Hunter Labs UltraScan® Sphere Spectrocolorimeter. Values are calculated according to ASTM Method D1925 by internal instrument software.

By this method, commercially available plasticized PVB's produced by companies such as DuPont, Solutia and Sekisui with trade names BUTACITE, SAFLEX and S-LEC, respectively, have been found to have YI values of 100-120. Therefore, any experimental value of 120 or less was deemed to pass the stability test.

Alternatively, stability was demonstrated by the preparation of a glass-resin-glass laminate. Extruded resin was dried in a vacuum oven overnight at 60° C. to provide "dry flake" that was pressed into a thin plaque. The plaque was bonded between two glass sheets at a temperature of 135° C. and under a pressure of 12 atmospheres (1.2 MPa) for 9 min. The laminate was allowed to cool to ambient temperature, visually inspected for clarity and absence of color, and was used to measure adhesion strength by the compressive shear strength test.

Test Method 3. Compressive Shear Strength

The compressive shear strength was determined by sawing a laminate into six 2.54 cm×2.54 cm chips. The chips are held in a jig at 45° and a compression testing instrument is used to place force on the chip at the rate of 0.25 cm/min. The amount of force to cause cohesive failure of the glass-PVB bond is the compressive shear strength of the laminate.

EXAMPLES

Comparative Example A

Hydrated polyvinyl butyral (PVB) resin, 441.5 grams and 59.3 weight percent resin, prepared according to techniques noted above, was added to a 2-L reactor. Deionized water, 1435.4 grams, was added to make a slurry with nominally 13 weight percent resin solids. The slurry was allowed to equilibrate to an absorption temperature of 40° C. for a period of 30 minutes. Triethyleneglycol di-2-ethylhexanoate ("3GO" plasticizer), 101.0 grams was added over a period of 15 minutes with the slurry under agitation at 900 rpm with an impeller system consisting of two 3.5 inch (8.9 cm) low shear 39° hydrofoils. After stirring the nominally 18% combined resin/plasticizer solids slurry with a total batch size of nominally 2000-grams at the set temperature for 1.5 hours, the absorption of the plasticizer was determined by measuring the residual plasticizer in the aqueous phase by Test Method 1. This value is used as a control for subsequent Examples 1-3.

Example 1

Plasticized polyvinyl butyral was prepared as in Comparative Example A except that after the slurry temperature had equilibrated, sodium acetate, (16.9 g), and glacial acetic acid, (5.2 g), were added. Triethyleneglycol di-2-ethylhexanoate ("3GO" plasticizer, 101.0 g) was added over a period of 15 minutes with the slurry under agitation at 900 rpm. After stirring at the set temperature for 1.5 h, the absorption of the plasticizer was determined by measuring the residual plasticizer in the aqueous phase by Test Method 1 and the value compared to that of Comparative Example A.

Examples 2-3

In Examples 2 and 3, plasticized polyvinyl butyral was prepared, processed, and analyzed according to the procedure of Example 1 except that the composition of the ionizable additive was as shown in Table 1.

Comparative Example B

In Comparative Example B, plasticized polyvinyl butyral was prepared, processed, and analyzed according to the procedure of Comparative Example A except that the reactor size was 3-L with two 3.5 inch (8.9 cm) low shear hydrofoils and one 2.5 inch (6.35 cm) low shear hydrofoil being used. The temperature was 44° C. and the agitation rate was 1120 rpm.

Example 4

In Example 4, plasticized polyvinyl butyral was prepared, process, and analyzed according to the procedure of Comparative Example B except that after the slurry temperature had equilibrated, citric acid (17.6 g) and sodium hydroxide (2.3 g) were added.

Examples 5-11

Examples 5-11 were prepared, processed, and analyzed according to the procedure of Example 4 except the concentration of the ionizable additive was progressively reduced as shown in Table 1.

Comparative Example C

In Comparative Example C, plasticized polyvinyl butyral was prepared according to the procedure of Comparative Example B, except the agitation rate was 760 rpm.

Examples 12-16

In each of Examples 12-16, plasticized polyvinyl butyral was prepared, processed, and analyzed according to the procedure of Comparative Example C except that ionizable additive was added as shown in Table 1.

Comparative Example D

In Comparative Example D, plasticized polyvinyl butyral was prepared according to the procedure of Comparative Example B, except a different batch of resin was used, the temperature was 40° C. and the agitation rate was 980 rpm.

Example 17

In Example 17, plasticized polyvinyl butyral was prepared according to the procedure of Comparative Examples A and C, except that after the slurry temperature was equilibrated, 4.0 g of potassium acetate and 4.43 g of magnesium acetate tetrahydrate (adhesion-controlling salts), were added. Triethyleneglycol di-2-ethylhexanoate ("3GO" plasticizer) was added and the slurry agitated at 980 rpm. After stirring at the set temperature for 1.5 h, the absorption of the plasticizer was determined by measuring the residual plasticizer in the aqueous phase by Test Method 1 and the value compared to that of Comparative Example D.

TABLE 1

| Example | Salt, Acid &/or Base 1 | 2 | Moles (1) | Moles (2) | Additive Conc (*) | Absorption Rate, $C_o/C_n$ () 1.5 hr | Stability (*) Pass/Fail |
|---|---|---|---|---|---|---|---|
| Comparative Example A | None | None | 0 | 0 | 0 | 1.000 | Pass |
| 1 | sodium acetate | acetic acid | 0.2062 | 0.0862 | 1.35% | 10.023 | Pass |
| 2 | sodium hydrogen carbonate | sodium hydroxide | 0.0604 | 0.0258 | 0.37% | 2.273 | Pass |
| 3 | CHES | arginine | 0.2981 | 0.2979 | 6.33% | 2.520 | Pass |
| Comparative Example B | None | None | 0 | 0 | 0 | 1.000 | Pass |
| 4 | citric acid | sodium hydroxide | 0.0917 | 0.0562 | 1.21% | 7.113 | Pass |
| 5 | citric acid | sodium hydroxide | 0.0526 | 0.2848 | 0.65% | 2.850 | Pass |
| 6 | citric acid | sodium hydroxide | 0.0263 | 0.1424 | 0.33% | 2.375 | Pass |
| 7 | citric acid | sodium hydroxide | 0.0132 | 0.0716 | 0.16% | 2.443 | Pass |
| 8 | citric acid | sodium hydroxide | 0.0123 | 0.0664 | 0.16% | 2.850 | Pass |
| 9 | citric acid | sodium hydroxide | 0.0059 | 0.0036 | 0.08% | 2.478 | Pass |
| 10 | citric acid | sodium hydroxide | 0.0029 | 0.0018 | 0.04% | 2.515 | Pass |
| 11 | citric acid | sodium hydroxide | 0.0015 | 0.0009 | 0.02% | 0.851 | Pass |
| Comparative Example C | None | None | 0 | 0 | 0 | 1.000 | Pass |
| 12 | acetic acid | None | 0.0035 | 0 | 0.01% | 2.000 | Pass |
| 13 | acetic acid | None | 0.0071 | 0 | 0.02% | 1.429 | Pass |
| 14 | N,N-diethylcyclohexylamine | sulfuric acid | 0.0103 | 0.0049 | 0.12% | 3.077 | Pass |
| 15 | N,N-diethylcyclohexylamine | sulfuric acid | 0.0786 | 0.0098 | 0.77% | 6.667 | Pass |
| 16 | N,N-diethylcyclohexylamine | acetic acid | 0.0032 | 0.0032 | 0.04% | 4.688 | Pass |
| Comparative Example D | None | None | 0 | 0 | 0 | 1.000 | Pass |
| 17 | potassium acetate | magnesium acetate tetra hydrate | 0.04 | 0.02 | 0.50% | 3.691 | Pass |

CHES: 2-[(N-cyclohexylamine)ethane]-sulfonic acid
(*) Concentration of total ionizable additive, was calculated based on the total weight of the aqueous phase complete slurry.
(**) Residual plasticizer in Examples was determined according to Text Method 1.
(***) Tested by Test Method 2 (or by the preparation of a glass laminate for adhesion testing in the case of Example 17).

The examples in Table 1 show that the addition of at least one ionizable additive accelerated absorption of plasticizer from an aqueous phase into the polymer. In the systems described in Table 1, increased concentration of the ionizable additive increased the absorption rate.

The examples show that different ionizable additives provided different levels of accelerated plasticization.

The range of concentrations of ionizable additives was between 0.01% and 7% dependent upon the system used. Over-all thermal polymer stability was not affected within this range.

What is claimed is:

1. A process for the production of plasticized polyvinyl acetal comprising the step of (a) producing an aqueous slurry comprising a polyvinyl acetal, a water-insoluble or sparingly soluble plasticizer, water, and an ionizable additive, (b) plasticizing the polyvinyl acetal by the polyvinyl acetal absorbing the water-insoluble or sparingly soluble plasticizer, and (c) isolating the plasticized polyvinyl acetal.

2. The process of claim 1 wherein the plasticizer is at least one of dibutyl sebacate, di-(beta-hydroxyethyl)adipate, triethyleneglycol di-2-ethylbutyrate, tetraethylene glycol di-heptanoate, and triethylene glycol di-2-ethylhexanoate.

3. The process of claim 1 wherein the ionizable additive is selected from ionizable components in the group consisting of: sodium acetate, sodium hydrogen carbonate, a buffer system containing sodium acetate and acetic acid, a buffer system containing sodium hydrogen carbonate and sodium hydroxide, a buffer system containing citric acid and sodium hydroxide, the quaternary salt of N,N-diethyl-cyclohexylamine with acetic acid, the quaternary salt of N,N-diethyl-cyclohexylamine with sulfuric acid, a salt comprising citric acid and sodium hydroxide, a salt comprising arginine and 2-[(N-cyclohexylamine)ethane]-sulfonic acid, acetic acid, potassium acetate, and magnesium acetate.

4. The process of claim 3 wherein the ionizable additive is selected from potassium acetate and magnesium acetate.

5. The process of claim 4 wherein the concentration of the ionizable additive is sufficient to provide a salt concentration in the range 30-500 mg/kg in the extruded resin.

6. The process according to claim 1 wherein the ionizable additive is present in a concentration of from about 0.01 to about 5.0 weight percent based on the total weight of the mixture.

7. The process according to claim 6 wherein the ionizable additive is a salt.

8. The process according to claim 1 wherein the ionizable additive is acetic acid.

9. The process of claim 1 wherein the aqueous slurry comprises a resin phase and aqueous phase in ratio of resin phase:aqueous phase of 10:90 to about 25:75 wherein the resin phase comprises the polyvinyl acetal and the water-insoluble or sparingly soluble plasticizer and the aqueous phase comprises the water and the ionizable additive, wherein the ionizable additive comprises at least one of a water-soluble ionizable acid, salt, base, or buffer system.

10. The process of claim 9 wherein the ratio of resin phase:aqueous phase is about 15:85 to about 20:80.

11. The process of claim 9 wherein the ionizable additive is selected from the group consisting of alkali and alkali earth metal acetates and citrates.

12. The process of claim 9 wherein the ionizable additive is selected from the group consisting of buffer systems containing sodium acetate and acetic acid.

13. The process of claim 9 wherein the ionizable additive is selected from potassium acetate and magnesium acetate.

14. The process of claim 9 wherein the ionizable additive is acetic acid.

15. The process of claim 1 wherein the polyvinyl acetal is polyvinyl butyral.

16. The process of claim 15 wherein (a) the polyvinyl butyral, ionizable additive, plasticizer, and water are slurried at a temperature of 20 to 65° C., (b) and in the slurry (i) the amount of plasticizer is from about 20 to about 50 parts by weight based on 100 parts by weight of dry polyvinyl butyral, (ii) the amount of water is from about 400 to about 1900 parts by weight, by weight based on 100 parts by weight of dry polyvinyl butyral, and (iii) the amount of the ionizable additive is from about 0.0001 to about 0.05 parts by weight based on 100 parts by weight of water.

17. The process of claim 1 wherein the aqueous slurry is prepared by producing an aqueous slurry of polyvinyl acetal resin, adding the ionizable additive to the aqueous slurry of the polyvinyl acetal resin, and then adding the plasticizer to the aqueous slurry of the polyvinyl acetal resin.

18. The process of claim 1 wherein after the plasticizing the plasticized polyvinyl acetal is in the form of a plasticized slurry containing about 10 to about 25 weight % solids (wet plasticized polyvinyl acetal) and about 90 to about 75 weight % of the aqueous phase; and the isolating the plasticized polyvinyl acetal comprises (i) feeding the plasticized slurry to a de-watering system that separates and removes 85-90 weight % of the aqueous phase, (ii) and extruding the remaining plasticized polyvinyl acetal while removing any remaining entrained water by vacuum extraction during the extruding.

19. The process of claim 18 further comprising forming a sheet from the extruded polyvinyl acetal.

20. The process of claim 18 wherein the polyvinyl acetal is polyvinyl butyral.

* * * * *